United States Patent [19]

Richwine

[11] Patent Number: 5,067,273
[45] Date of Patent: Nov. 26, 1991

[54] LAWN EDGING

[76] Inventor: Mark H. Richwine, 7921 Stockwell St., Lincoln, Nebr. 68506

[21] Appl. No.: 525,120

[22] Filed: May 17, 1990

[51] Int. Cl.$^5$ ................................................ A01G 1/00
[52] U.S. Cl. ........................................ 47/33; 52/102; 404/6
[58] Field of Search ................... 47/33; 52/102; 404/6, 404/7, 8

[56] References Cited

U.S. PATENT DOCUMENTS

| | | | |
|---|---|---|---|
| 2,662,342 | 12/1953 | Peterson | 47/33 |
| 2,744,357 | 5/1956 | Foote | 47/33 |
| 3,277,606 | 10/1966 | Cohen | 47/33 |
| 3,378,949 | 4/1968 | Dorris | 47/33 |
| 3,411,977 | 11/1968 | Slater | 47/33 |
| 3,619,944 | 11/1971 | Matrey | 47/3 |
| 4,858,379 | 8/1989 | West | 47/33 |
| 4,984,689 | 1/1991 | Emalfarb | 47/33 |

FOREIGN PATENT DOCUMENTS 1422293 11/1965 France ..................... 47/33

*Primary Examiner*—Henry E. Raduazo
*Attorney, Agent, or Firm*—Zarley, McKee, Thomte, Voorhees & Sease

[57] ABSTRACT

Lawn edging includes an elongated top portion which is removably cooperable with an elongated base portion. The top and base portions are interconnectable so as to form a single integrated unit. The base portion of the lawn edging includes a pair of upstanding walls which are parallel and spaced apart so as to receive a flange depending from the top portion. The base portion has a horizontally oriented base strip projecting perpendicularly outwardly from the lower end of the upstanding walls. A generally cylindrical ridge portion is formed along the longitudinal edge of the top portion so as to strengthen the top portion of the edging.

2 Claims, 1 Drawing Sheet 5,067,273

LAWN EDGING

TECHNICAL FIELD

The present invention relates generally to edging material utilized for inhibiting grass growth into gardens and the like, and more particularly to an improved lawn edging with a removable portion to allow for effective mowing of grass adjacent the edging material.

BACKGROUND OF THE INVENTION

Edging materials have proved to be effective in inhibiting grass growth into adjoining gardens or other soil areas. Prior art edging is commonly formed of flexible plastic or the like and is packaged in relatively long rolls which may be cut to the desired length and bent to the appropriate shape of the border to be edged. The edging material is generally secured in place by burying the lower half in the ground, with an upper edge projecting to separate the lawn from the garden or soil area.

One major problem with edging materials currently utilized, is in the difficulty of mowing grass immediately adjacent the edging material. It is typically necessary to utilize a separate machine for trimming around such edging material, since lawn mowers cannot typically cut grass which is located immediately adjacent such an object.

It is therefore a general object of the present invention to provide an improved edging material which will maintain a division between grass and soil areas.

Another object of the present invention is to provide edging material which is separated into two portions, one projecting portion being removable from a lower ground-supported portion.

Another object is to provide edging material which permits mowing of grass located immediately adjacent the edging material.

These and other objects will be apparent to those skilled in the art.

SUMMARY OF THE INVENTION

The lawn edging of the present invention includes an elongated top portion which is removably cooperable with an elongated base portion. The top and base portions are interconnectable so as to form a single integrated unit. The base portions of the lawn edging includes a pair of upstanding walls which are parallel and spaced apart so as to receive a flange depending from the top portion. In the preferred embodiment of the invention, the base portion has a horizontally oriented base strip projecting perpendicularly outwardly from the lower end of the upstanding walls. A generally cylindrical ridge portion is formed along the longitudinal edge of the top portion so as to strengthen the top portion of the edging.

DESCRIPTION OF THE PREFERRED EMBODIMENT

Figure 1:
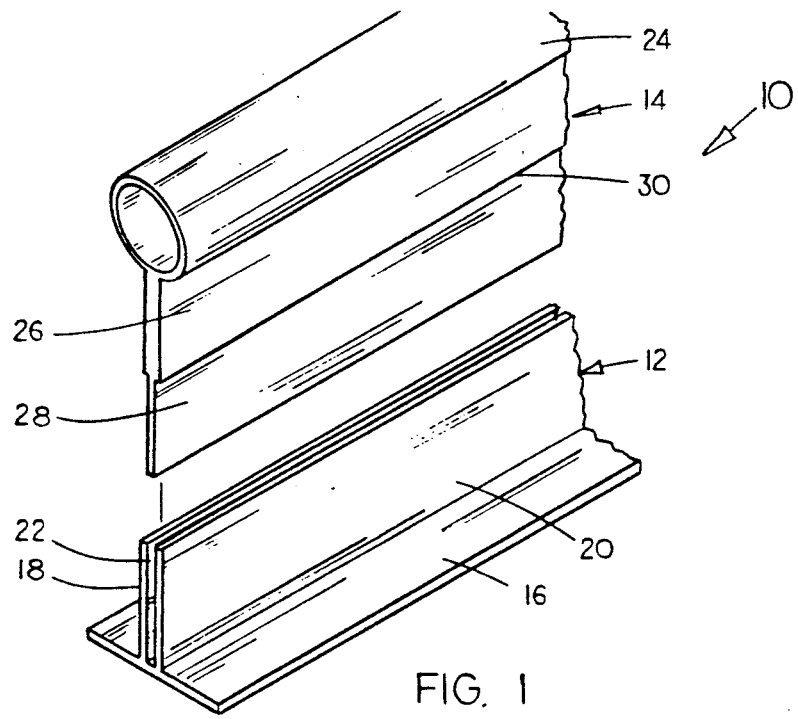
FIG. 1 is an exploded perspective view of the edging material of the present invention.

Referring now to the drawings, in which similar or corresponding parts are identified with the same reference numeral, and more particularly to FIG. 1, the lawn edging of the present invention is identified generally at 10 and includes a base portion 12 and a cooperable and removable top portion 14. Lawn edging 10 is formed of a resilient material to permit bending of the material to form curves to conform with irregular shaped border areas.

Base portion 12 includes a horizontally oriented base strip 16, with a pair of parallel walls 18 and 20 projecting upwardly therefrom. Walls 18 and 20 project generally from the central portion of base strip 16 and extend longitudinally the entire length of base strip 16. Base strip 16 extends horizontally beyond walls 18 and 20 to form a general upside down "T" shape. The slot formed between walls 18 and 20, designated generally at 22, is designed to receive top portion 14 as described in more detail hereinbelow.

Figure 2:
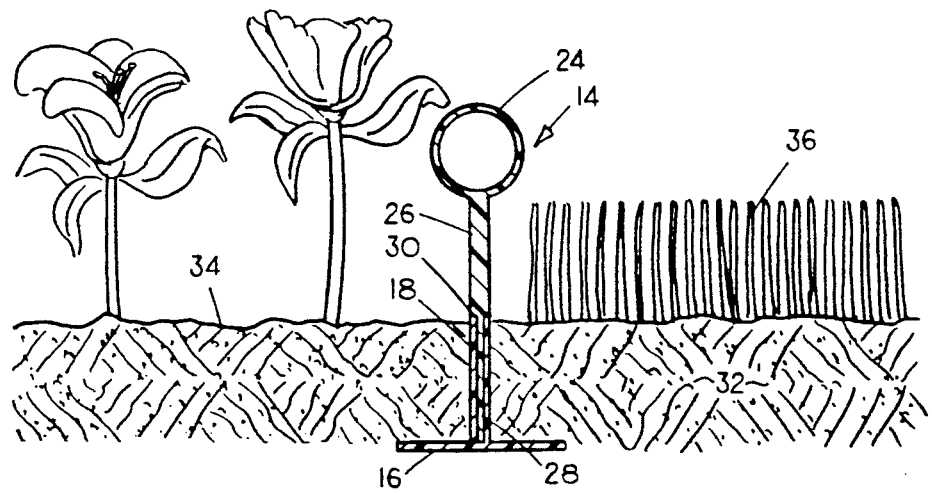
FIG. 2 is a cross-sectional view through the edging material of the present invention installed in the ground.

The portion 14 includes a generally cylindrical ridge portion 30 which has a vertical strap 26 so as to form shoulders 30, depending therefrom and extending the length of ridge 24. A flange 28 is centered along the bottom edge 30 of depending strap 26 and extends the longitudinal length of strap 26. Flange 28 has a thickness substantially equal to the width of slot 22 and is designed to cooperate therewith. The depth of flange 28 is equal to or less than the depth of slot 22 such that insertion of flange 28 into slot 22 will permit strap 26 to be lowered until shoulders 30 contact upper edges of walls 18 and 20, as shown in FIG. 2. Preferably, the thickness of strap 26 is equal to the thickness of walls 18 and 20 and the slot therebetween. Thus, when top portion 14 is joined with base portion 12, lawn edging 10 will appear as an integral unit.

Figure 3:
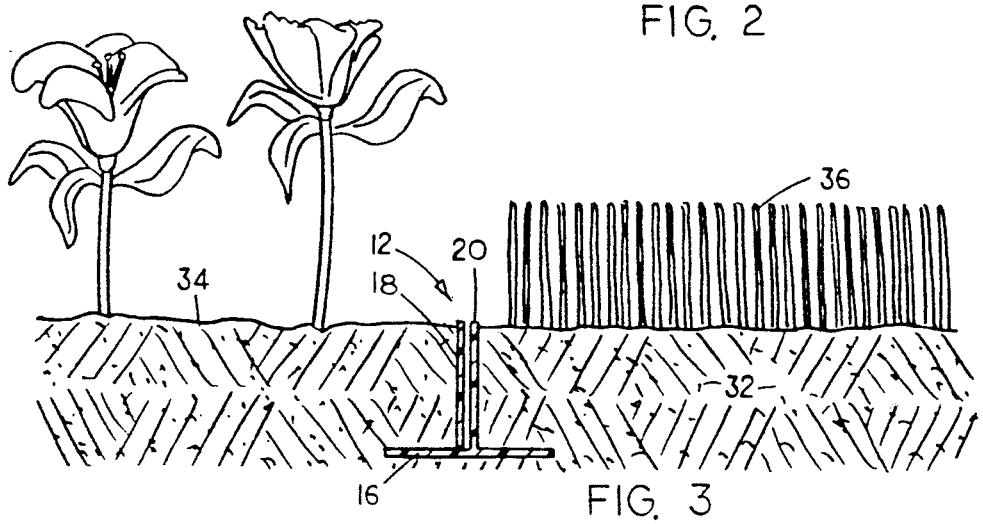
FIG. 3 is a cross-sectional view similar to FIG. 2, but with the upper portion of the lawn edging removed.

Referring now to FIGS. 2 and 3, base portion 12 is positioned in the ground 32 with the upper edge of walls 18 and 20 generally flush with the top surface 34 of ground 32. Because of the horizontally extending portions of base strip 16, it is necessary to dig a trench, position base portion 12, and then backfill dirt on top of base strip 16, in order to mount base portion 12 in the ground. Top portion 14 may then be connected to base portion 12 by journaling the flange 28 between walls 18 and 20 and sliding top portion 14 downward until edge 30 meets the top edge of walls 18 and 20.

Because of the position of grass 36 closely adjacent lawn edging 10, it is difficult to mow this grass. To simplify the situation, it is only necessary to pull upwardly on top portion 14 to remove the top portion from the base portion and permit a lawn mower to roll over the top surface of the ground 34 to mow grass 36. Top portion 14 then may be easily replaced by inserting flange 28 between walls 18 and 20.

Whereas the invention has been shown and described in connection with the preferred embodiments thereof, it will be understood that many modifications, substitutions and additions may be made which are within the intended broad scope of the appended claims. There has therefore been shown and described an improved lawn edging which accomplishes at least all of the above-stated objects.

I claim:

1. Lawn edging, comprising:

an elongated top portion removably cooperable with an elongated base portion;

said base portion having a pair of parallel upstanding walls with a slot formed between said walls; and said top portion having a depending flange adapted to cooperate with said slot to form a single integrated unit, said depending flange having a length, depth and thickness substantially equal to said slot so as to slide vertically within the slot to completely fill said slot when said top portion and base portion are cooperably joined;

said top portion including a generally vertical strap extending the length of the top portion, said strap having a lower edge;

said depending flange having a thickness less than that of the strap and depending generally centrally from the lower edge thereof, so as to form shoulders on each side of the flange at the juncture to said lower edge;

said upstanding walls and slot therebetween having a total thickness equal to the thickness of said strap, so as to form flush vertical surfaces from said strap to said walls when said top and base portion are cooperably joined;

said base portion further comprising a generally horizontally oriented base strip from which said parallel walls project vertically upwardly, said strip located so as to project perpendicularly outwardly from said walls;

said top portion including an enlarged ridge portion wider than said depending flange and extending the length of said top portion to strengthen said top portion.

2. The lawn edging of claim 1, wherein said ridge portion is generally cylindrical.

* * * * *